United States Patent
Boyd et al.

(10) Patent No.: US 7,322,247 B2
(45) Date of Patent: Jan. 29, 2008

(54) GASKET HAVING A FIBER-OPTIC PRESSURE SENSOR ASSEMBLY

(75) Inventors: Clark D. Boyd, Radford, VA (US); Charles B. Gause, Blacksburg, VA (US); Trevor Rice, Blacksburg, VA (US); Larry Vicari, Christiansburg, VA (US)

(73) Assignee: Dana Corporation, Toledo, OH (US)

( * ) Notice: Subject to any disclaimer, the term of this patent is extended or adjusted under 35 U.S.C. 154(b) by 80 days.

(21) Appl. No.: 11/224,442

(22) Filed: Sep. 12, 2005

(65) Prior Publication Data

US 2006/0005628 A1   Jan. 12, 2006

Related U.S. Application Data

(62) Division of application No. 10/652,370, filed on Aug. 29, 2003, now Pat. No. 6,945,117.

(51) Int. Cl.
  *G01L 7/06* (2006.01)
(52) U.S. Cl. .................. 73/729.1; 73/729.2
(58) Field of Classification Search ............ 73/705, 73/706, 717, 753, 729.1, 729.2; 361/283.1
See application file for complete search history.

(56) References Cited

U.S. PATENT DOCUMENTS

| | | | |
|---|---|---|---|
| 4,250,490 A * | 2/1981 | Dahlke | 340/870.37 |
| 4,287,501 A * | 9/1981 | Tominaga et al. | 338/42 |
| 4,393,687 A | 7/1983 | Muller et al. | |
| 4,397,176 A | 8/1983 | Rohde et al. | |
| 4,414,634 A * | 11/1983 | Louis et al. | 702/45 |
| 4,419,898 A * | 12/1983 | Zanker et al. | 73/861.02 |
| 4,446,730 A * | 5/1984 | Smith | 73/301 |
| 4,509,370 A | 4/1985 | Hirschfeld | |
| 4,599,901 A | 7/1986 | Hirschfeld | |
| 4,686,861 A | 8/1987 | Morii | |
| 4,920,261 A | 4/1990 | Bock et al. | |
| 5,065,010 A | 11/1991 | Knute | |
| 5,107,847 A | 4/1992 | Knute et al. | |
| 5,121,929 A | 6/1992 | Cobb | |
| 5,195,365 A | 3/1993 | Chujo et al. | |
| 5,230,238 A | 7/1993 | Takeuchi | |
| 5,301,001 A | 4/1994 | Murphy et al. | |
| 5,380,014 A | 1/1995 | Schaperkotter | |
| 5,452,087 A | 9/1995 | Taylor et al. | |
| 5,659,132 A | 8/1997 | Novak et al. | |
| 5,714,680 A | 2/1998 | Taylor et al. | |
| 6,003,872 A | 12/1999 | Nord | |

(Continued)

*Primary Examiner*—Andre J. Allen
(74) *Attorney, Agent, or Firm*—Marshall & Melhorn LLC

(57) ABSTRACT

A sensor assembly includes a stainless steel tubular housing. Within the housing is a polyetheretherketone tube and a sensor. An optical fiber joins the sensor to a transmission cable and is fixedly positioned within the tube. A first end of the housing includes a pressure transmission device or bellows and the second end of the housing is crimped about the tube to fixedly position the tube and the sensor within the housing. The sensor assembly is positioned within a channel of a gasket to obtain pressure data from a combustion chamber. This abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

19 Claims, 3 Drawing Sheets

U.S. PATENT DOCUMENTS

| | | |
|---|---|---|
| 6,016,702 A | 1/2000 | Maron |
| 6,122,971 A | 9/2000 | Wlodarczyk |
| 6,131,465 A | 10/2000 | Wlodarczyk et al. |
| 6,439,055 B1 | 8/2002 | Maron et al. |
| 6,532,737 B1 | 3/2003 | Kozerski et al. |
| 6,609,427 B1 | 8/2003 | Westfield et al. |
| 2002/0194917 A1 | 12/2002 | Fernald et al. |

* cited by examiner

GASKET HAVING A FIBER-OPTIC PRESSURE SENSOR ASSEMBLY

CROSS REFERENCE TO RELATED APPLICATIONS

The present application is a divisional application of U.S. patent application Ser. No. 10/652,370 filed on Aug. 29, 2003, now U.S Pat. No. 6,945,117 which is incorporated herein by reference in its entirety.

TECHNICAL FIELD

This invention relates generally to gaskets incorporating pressure sensors to collect data from a combustion chamber. More particularly, the invention relates to a pressure sensor assembly capable of being received into channels of the gasket so as to protect the pressure sensor from the harsh environment of the combustion chamber.

BACKGROUND OF THE INVENTION

Various controls of an internal combustion engine, such as the air/fuel mixture and compression ratio of combustion chambers, are monitored and adjusted by an electronic control unit. However, to perform the necessary adjustments, the electronic control unit needs current and accurate data from within the combustion chamber. Specifically, pressure data from within each combustion chamber of the engine is highly beneficial when calculating adjustments to the air/fuel mixture or compression ratio to produce a more efficient engine. Accordingly, sensors must be employed in or near the combustion chamber to record such data and transmit the information to the electronic control unit.

In the past, automobile manufacturers have used spring-activated pressure gauges and piezoelectric transducers as combustion chamber pressure sensors. The spring-activated pressure gauges were positioned in a port of the cylinder wall or in a port of the cylinder head of the engine. However, the spring-activated pressure sensing devices did not operate reliably at the high temperatures generally present in the combustion chamber. Further, piezoelectric transducers were also employed as pressure sensors. However, the piezoelectric transducers were also extremely vulnerable to the high temperature environment of the combustion chamber and require cooling via recirculating water or air.

Today, optical fibers are commonly used in pressure sensor assemblies. In operation, strain from an elastic structure, such as a bellows, is transmitted to the sensor via an optic fiber. The connection between the elastic structure and the sensor must be very stable to prevent a phenomenon known as "creep" or a change in strain on the sensing element with no change in applied load on the elastic structure. The "creep" phenomenon distorts the data transmitted to the electronic control unit and unnecessary changes are made to the vehicle's controls. Further, the pressure sensor assembly must be positioned in or near the combustion chamber to collect accurate data. Accordingly, the pressure sensor assembly must withstand the high temperature and high pressure environment present in the combustion chamber in order to provide accurate data to the electronic control unit.

Therefore, a pressure sensor assembly capable of withstanding the harsh environment of the combustion chamber is needed. More specifically, a pressure sensor assembly properly positioned to collect accurate data from the combustion chamber but able to withstand the harsh environment of the combustion chamber is needed in the automotive industry.

SUMMARY OF THE INVENTION

The present invention is a sensor assembly for use in collecting data from a combustion chamber of an automotive engine. The sensor assembly comprises a housing having a first end and a second end. A tube and a sensor are both positioned with the housing. The first end of the housing includes a pressure transmission device and the second end of the housing is sealed about the tube to fixedly position the tube and the sensor within the housing.

The present invention also discloses a gasket for receiving the sensor assembly. The gasket comprises first and second layers mated to each other and each having a channel on their mating surfaces. The sensor assembly is received in the channels to collect data. The sensor assembly further includes a sensor positioned within a tube and the tube positioned within a housing. The first end of the housing is a pressure transmission device and the second end of the housing is sealed about the tube.

DETAILED DESCRIPTION OF THE INVENTION

Figure 1:
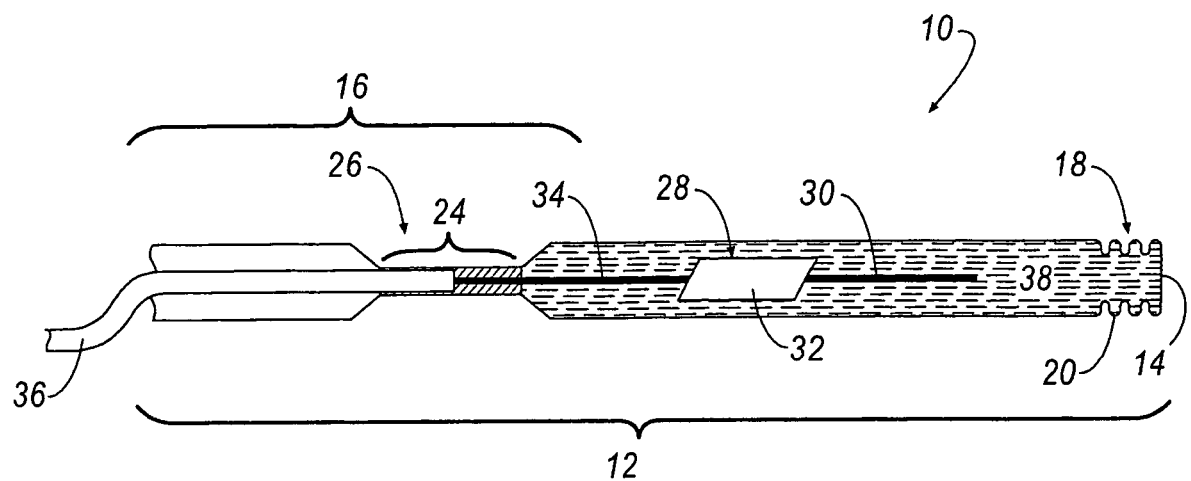
FIG. 1 is a cross-sectional view of a sensor assembly of the present invention.
Figure 2:
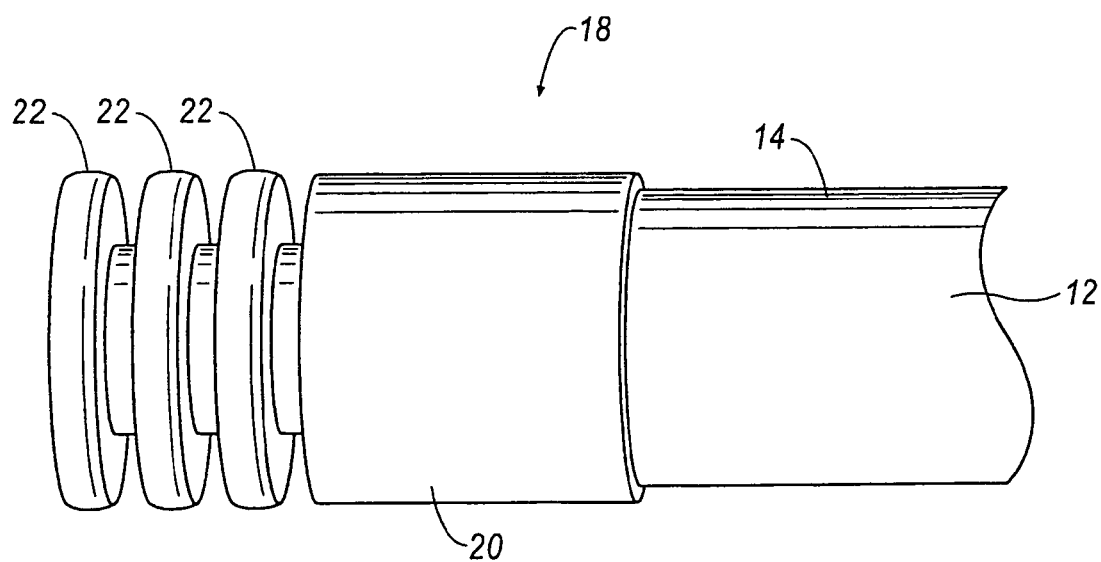
FIG. 2 is a plan view of a first end of the sensor assembly having a bellows.

Referring to FIG. 1, a sensor assembly is generally shown at 10. The sensor assembly 10 includes a housing 12. The housing 12 is generally tubular and preferably made from stainless steel. The housing 12, however, may also be formed from other materials. The housing 12 includes a first end 14 and a second end 16. The first end 14 includes a pressure transmission device generally shown at 18. More specifically, the pressure transmission device 18 is a bellows 20. The bellows 20 is elastic and preferably made from nickel. Nickel provides a high resistance to deformation and does not compromise the accuracy of the sensor assembly. Other more expensive materials, such as stainless steel and high-nickel alloys are also contemplated by the present invention As best seen in FIG. 2, the bellows 20 is joined to the first end 14 of the housing 12 by capping the first end 14 and then preferably soldering the bellows 20 to the housing 12. The bellows 20, as illustrated, includes three elastic portions 22; however, any number of elastic portions 22 is acceptable as determined necessary by one skilled in the art.

Referring again to FIG. 1, positioned within the housing 12 is a tube 24. Preferably, the tube 24 is a thermoplastic tube 24 made substantially from polyetheretherketone (PEEK). It is understood, however, that other suitable materials are also contemplated by the present invention. PEEK is a high-temperature thermoplastic that provides proper sealing at high temperatures and pressures. The tube 24 is positioned at the second end 16 of the housing 12 and the second end 16 is sealed about the tube 24 to fixedly position the tube 24 within the housing 12. One preferable technique for sealing the second end 16 about the tube 24 is to crimp the housing 12, as shown generally at 26 in FIG. 1. The crimp seal 26 is a quick and easy technique to use in the manufacturing environment. Crimping the second end 16 is only one preferable technique; the second end 16 may also be sealed about the tube 24 by the use of solder or an adhesive. Other techniques may also be contemplated by one skilled in the art. Regardless of the technique, the second end 16 is sealed about the tube 24 to fixedly position the tube 24 within the housing 12 and prevent the phenomenon known as "creep" as described in the Background of the present disclosure.

Also positioned within the housing 12 is a sensor generally shown at 28 in FIG. 1. The sensor 28 is a fiber optic sensor 28. Specifically, an extrinsic fabry-perot interferometer is preferred, but any sensor is acceptable. The sensor is used to collect pressure data; however, other variables, such as temperature, may also be collected. The fiber optic sensor 28 includes a first optical fiber 30 that extends from a sensing element 32 towards the first end 14 of the housing 12, or bellows 20. A second optical fiber 34 connects the sensing element 32 to a transmission cable 36 and the transmission cable relays the data to a processing device, such as an electronic control unit (not shown) in an automotive vehicle.

The transmission cable 36 and second optical fiber 34 are joined within the tube 24 at the second end 16 of the housing 12. Accordingly, when the second end 16 of the housing 12 is sealed about the tube 24, the sensor 28 is then fixedly positioned within the housing 12. Further, the sensor 28 is also fixedly positioned within the tube 24 because the thermoplastic tube 24 seals about the second optical fiber 34 of the sensor 28. As contemplated by the present invention, when the second end 16 of the housing 12 is crimped about the tube 24, the tube 24 is deformed. This deformation seals the tube 24 about the second optical fiber 34 and transmission cable 36 to fixedly position the sensor 28 within the housing 12 but does not affect the signal being transmitted from the sensing element 32 to the transmission cable 36 or from the transmission cable 36 to the processing device (not shown.). This technique also prevents the phenomenon known as "creep" as described in the Background of the present disclosure. The transmission cable 36 exits the housing 12 at the second end 16.

The housing 12 of the present invention is filled with a fluid 38. Fluid 38 is preferably a high-temperature oil such as silicone oil or highly-refined mineral oil. Other fluids are contemplated by the present invention and typically have a low coefficient of thermal expansion and are able to withstand high temperatures. The fluid 38 fills the bellows 20 and the housing 12 to suspend the sensor 28. The fluid 38 provides shock and vibration isolation to prevent the sensor 28 from contacting the inner walls of the housing 12 when subjected to a shock or vibration. The seal of tube 24 about the second optical fiber 34 and transmission cable 36 prevents the transmission of fluid 38 from the housing 12 into contact with the transmission cable 36.

During assembly, the sensor 28 and transmission cable 36 are positioned within the tube 24 and the tube 24 is further positioned within the housing 12. The housing 12 is then crimped at the second end 16 to fixedly position the tube 24 and the sensor 28. Fluid 38 is vacuum filled into the housing 12 by submerging the assembly 10 in the fluid 38 and using a vacuum (not shown) to remove air from within the housing 12. The bellows 20 is then soldered into place at the first end 14 of the housing 12.

Figure 3:
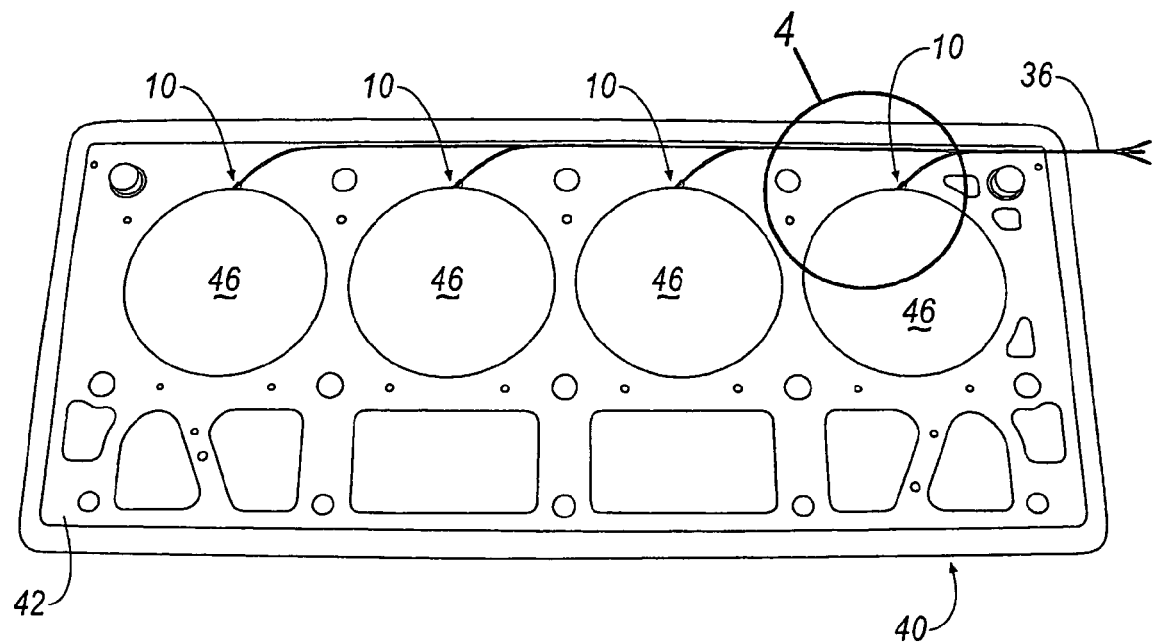
FIG. 3 is a top view of a layer of a gasket having a pressure sensor assembly received in a channel.
Figure 4:
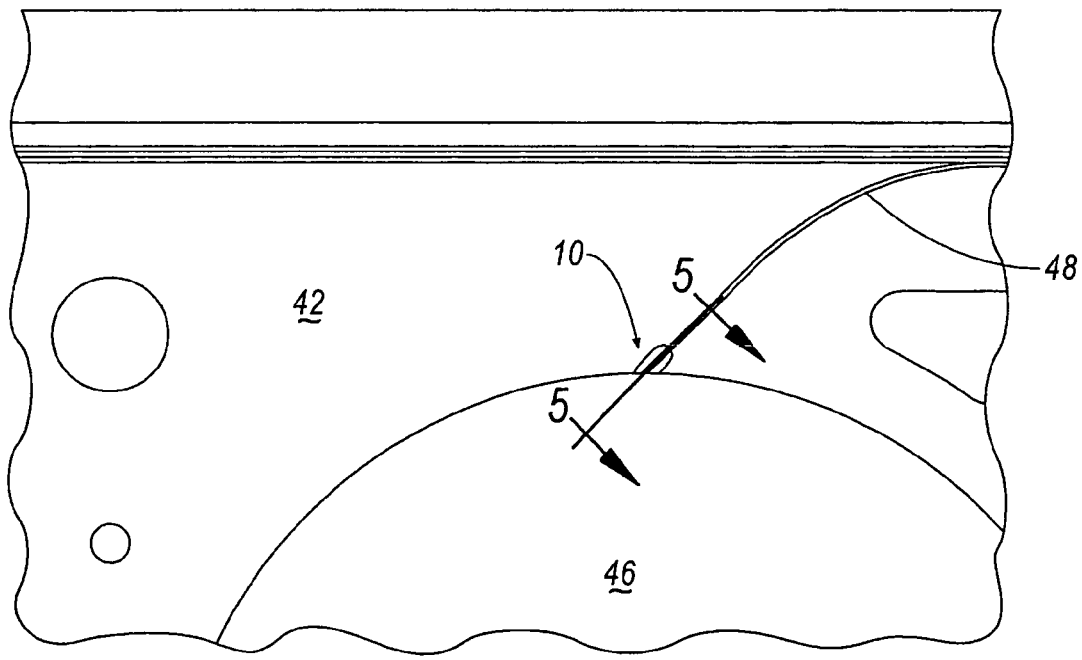
FIG. 4 is an enlarged view of the pressure sensor assembly received in the channel of FIG. 3.
Figure 5:
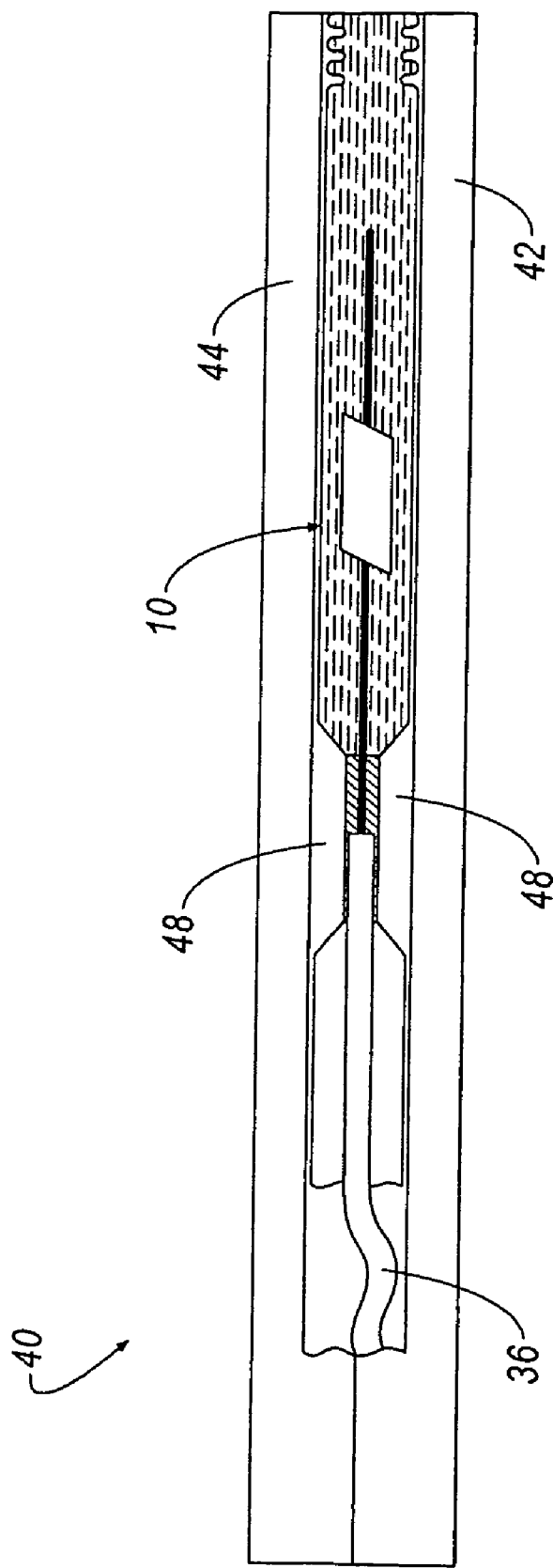
FIG. 5 is a cross-sectional view of the gasket taken along the line 5-5 in FIG. 4.

Referring to FIGS. 3-5, a gasket is generally shown at 40. The gasket 40 has at least a first layer 42 and a second layer 44. The layers 42, 44 are mated to each other and each include at least one opening 46. As illustrated, the layers 42, 44 also include cooperating channels 48 on the mating surfaces of each layer 42, 44. The channels 48 are best seen in the cross-sectional illustration of FIG. 5. The channels 48 of each layer 42, 44 cooperate to receive the sensor assembly 10 described above. The present invention also contemplates only one of the layers 42, 44 having a channel 48 to solely receive the sensor assembly 10.

Gasket 40 is preferably a cylinder head gasket 40. The openings 46 of gasket 40 include not only fluid and coolant openings but also combustion openings 46 about a combustion chamber (not shown). In the present invention, the sensor assembly 10 is positioned at a periphery of the opening 46 to collect pressure data from within the combustion chamber. However, the sensor assembly 10 may be positioned about any opening to collect any necessary data. As illustrated in FIG. 4, the present invention also contemplates having a plurality of sensor assemblies 10 within a single gasket 40 for collecting pressure data from a plurality of openings 46 about the combustion chambers of an internal combustion engine.

It is to be understood that the above description is intended to be illustrative and not limiting. Many embodiments will be apparent to those skilled in the art upon reading the above description. The scope of the invention should be determined, however, not with reference to the above description, but with reference to the appended claims with the full scope of equivalents to which the claims are entitled.

What is claimed:

1. A gasket comprising:
    at least a first layer and a second layer mated to each other wherein at least one of said layers includes a channel formed on a mating surface of said layer;
    a sensor assembly received in said channel to collect data;
    wherein said sensor assembly includes a sensor positioned within a tube and said tube positioned within a housing, said housing having a first end of a pressure transmission device and a second end sealed about said tube.

2. A gasket, as in claim 1, wherein said gasket is a cylinder head gasket and said sensor assembly collects pressure data from a combustion chamber.

3. A gasket, as in claim 2, wherein said at least first layer and second layer each include cooperating channels for receiving said sensor assembly.

4. A gasket, as in claim 2, wherein said gasket includes an opening and said pressure transmission device of said sensor assembly is positioned at a periphery of said opening.

5. A gasket, as in claim 2, wherein said tube is a thermoplastic tube of polyetheretherketone and said housing is a stainless steel tube housing.

6. A gasket, as in claim 2, wherein said sensor assembly further includes a fluid within said housing for suspending said sensor within said housing.

7. A gasket, as in claim 2, wherein said second end sealed about said tube fixedly positions said tube within said housing and impacts said tube to fixedly position said sensor within said tube.

8. A gasket comprising:
    a first layer and a second layer mated to each other wherein at least one of said layers includes a channel formed on a mating surface of said layer;
    a fiber-optic sensor assembly received in said channel to collect data;

wherein said sensor assembly includes a fiber-optic sensor positioned within said channel, said fiber-optic sensor assembly includes a transmission device in communication with said fiber-optic sensor.

9. The gasket of claim 8, wherein said gasket is a cylinder head gasket and said sensor assembly collects pressure data from a combustion chamber.

10. The gasket of claim 8, wherein said first layer and said second layer each include cooperating channels for receiving said fiber-optic sensor assembly.

11. The gasket of claim 8, wherein said gasket includes an opening and said transmission device of said sensor assembly is positioned at a periphery of said opening.

12. The gasket of claim 8, wherein said fiber-optic sensor is at least partially disposed within a metallic housing.

13. The gasket of claim 12, wherein said fiber-optic sensor assembly includes a thermoplastic tube of polyetheretherketone sealed to said metallic housing.

14. The gasket of claim 12, wherein said fiber-optic sensor assembly further includes a fluid within said housing for suspending said fiber-optic sensor within said housing.

15. A cylinder bead gasket for an internal combustion engine having a combustion chamber comprising:
   a first layer disposed proximate a second layer wherein at least one of said layers includes a channel formed on a mating surface of said layer;
   a fiber-optic sensor assembly received at least partially in said channel adapted to collect combustion chamber data; and
   wherein said sensor assembly includes at least one fiber-optic sensor positioned within said channel, said fiber-optic sensor assembly includes a transmission device proximate the combustion chamber, said fiber-optic sensor is at least partially disposed inside a metallic housing.

16. The gasket of claim 15, wherein said at least first layer and second layer each include cooperating channels for receiving said fiber-optic sensor assembly.

17. The gasket of claim 15, wherein said gasket includes an opening and said transmission device of said sensor assembly is positioned generally at a periphery of said opening.

18. The gasket of claim 15, wherein said fiber-optic sensor includes a Thermoplastic tube of polyetheretherketone disposed at least partially inside said metallic housing.

19. The gasket of claim 15, wherein said fiber-optic sensor assembly further includes a fluid within said metallic housing for suspending said sensor within said housing.

* * * * *